US006654264B2

(12) United States Patent
Rose (10) Patent No.: US 6,654,264 B2
(45) Date of Patent: Nov. 25, 2003

(54) SYSTEM FOR PROVIDING A REGULATED VOLTAGE WITH HIGH CURRENT CAPABILITY AND LOW QUIESCENT CURRENT

(75) Inventor: Bruce W. Rose, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/735,854

(22) Filed: Dec. 13, 2000

(65) Prior Publication Data

US 2002/0070718 A1 Jun. 13, 2002

(51) Int. Cl.[7] .................................................. H02M 7/00
(52) U.S. Cl. ........................... 363/65; 307/57; 323/269; 323/272
(58) Field of Search ..................... 363/65, 72; 323/269, 323/272, 268, 350; 307/57, 71, 76, 82; 361/18, 87

(56) References Cited

U.S. PATENT DOCUMENTS

| 3,521,150 | A | * | 7/1970 | Bates ........................... 323/272 |
| 4,675,770 | A | * | 6/1987 | Johansson ...................... 361/18 |
| 4,879,504 | A | * | 11/1989 | McVey ........................ 323/272 |
| 5,045,712 | A | * | 9/1991 | Baggenstoss ................. 307/29 |
| 5,969,512 | A | * | 10/1999 | Matsuyama .................. 323/272 |
| 6,166,934 | A | * | 12/2000 | Kajouke et al. .............. 363/65 |
| 6,232,754 | B1 | * | 5/2001 | Liebler et al. .............. 323/272 |

* cited by examiner

Primary Examiner—Michael Sherry
Assistant Examiner—Gary L. Laxton
(74) Attorney, Agent, or Firm—Schwegman, Lundberg, Woessner & Kluth, P.A.

(57) ABSTRACT

A voltage regulator system includes a plurality of individual voltage regulators that are compounded to provide both high output current capability and low quiescent current at low load currents.

20 Claims, 5 Drawing Sheets

SYSTEM FOR PROVIDING A REGULATED VOLTAGE WITH HIGH CURRENT CAPABILITY AND LOW QUIESCENT CURRENT

FIELD OF THE INVENTION

The invention relates generally to voltage regulator circuits and, more particularly, to voltage regulator circuits that are required to provide a widely varying load current.

BACKGROUND OF THE INVENTION

Many electrical devices have multiple modes of operation that each draw a different level of current from an associated power supply. These multiple modes of operation will often be used, for example, to facilitate power conservation within the device. For example, a handheld communicator unit that utilizes a battery as a power source will typically switch between a number of different modes during operation of the communicator to minimize the current draw from the battery. In one scenario, for example, a communicator will switch between a low current sleep mode, a medium current communicate mode, and a relatively high current operate mode when the communicator is turned on. Many other scenarios are also possible.

In the past, a single voltage regulator was commonly used to generate a regulated supply voltage for all of the different operating modes of an electrical device. Naturally, the maximum current of the voltage regulator had to be adequate to handle the highest possible current to be drawn by the device. To maintain stability within a voltage regulator, the quiescent current of the regulator is typically between 0.1 and 3 percent of the maximum current of the regulator. This quiescent current flows regardless of the present output current of the regulator or the present mode of operation of the driven device. Thus, a relatively large quiescent current will flow in the regulator even when the driven device is in a very low current sleep mode. As can be appreciated, this relatively large quiescent current can represent a significant power drain in an electrical circuit. This power drain is especially troublesome in circuits having limited available power, such as battery driven circuits.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to a voltage regulator system having relatively high current capability with a relatively low quiescent current during low load conditions. In a preferred approach, the quiescent current of the voltage regulator system changes based on a present load condition of the system. Thus, the voltage regulator system generates a relatively high quiescent current when a high load current is being drawn and a relatively low quiescent current when a low load current is being drawn. Various intermediate quiescent current levels may also be generated. The voltage regulator system can be advantageously used to provide a regulated voltage to any of a wide range of electrical devices, circuits, or systems that typically draw a widely varying load current from a power source. The system is particularly beneficial for use with electrical devices that have multiple operating modes that each draw a significantly different load current from a power source. The voltage regulator system generally increases the efficiency with which power is supplied to an electrical device and is thus desirable for use in applications where power conservation is a principal concern (e.g., battery powered systems). In one approach, the system utilizes a plurality of individual voltage regulators that are each connected to a common output terminal. One of the regulators remains active at all times during system operation. Each of the other regulators is enabled based upon a current condition in a previous regulator. Thus, the number of individual voltage regulators providing power to an electrical device will depend upon a present current draw of the device. Because only a single regulator having a relatively low quiescent current is enabled during low load conditions, the overall quiescent current of the voltage regulator system remains low during this time.

Figure 1:
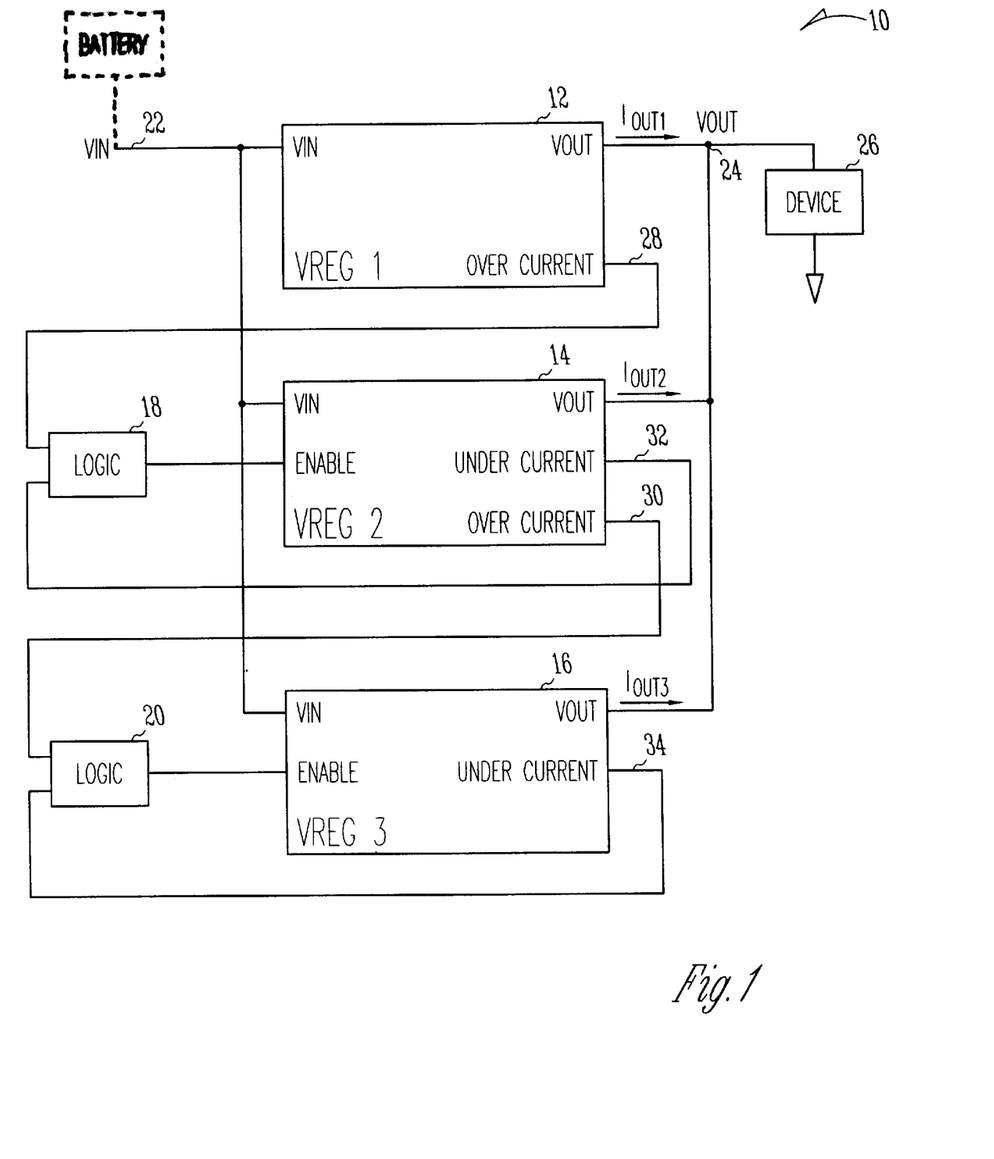
FIG. 1 is a block diagram illustrating a voltage regulator system in accordance with one embodiment of the present invention.

FIG. 1 is a block diagram illustrating a voltage regulator system 10 in accordance with one embodiment of the present invention. The voltage regulator system 10 is operative for providing a regulated supply voltage to a load device 26 that is coupled to an output terminal 24 of the system 10. In a typical application, the load device 26 will be capable of drawing a widely varying load current from the system 10. The voltage regulator system 10 is capable of providing a relatively high load current to the device 26 when needed, but will maintain a relatively low quiescent current when the device 26 is drawing smaller load currents. As illustrated, the voltage regulator system 10 includes: a first voltage regulator 12, a second voltage regulator 14, a third voltage regulator 16, and first and second logic circuits 18, 20. The voltage regulator system 10 also includes an input terminal 22 for receiving an input voltage Vin from a power supply (e.g., a battery). In one implementation, the voltage regulator system 10 and the load device 26 are both part of a single electrical apparatus having a common support structure (e.g., a handheld communicator unit).

As illustrated in FIG. 1, the input terminal 22 of the system 10 is coupled to an input of each of the first, second, and third voltage regulators 12, 14, 16. Similarly, the output terminal 24 of the system 10 is coupled to an output of each of the voltage regulators 12, 14, 16. The first and second voltage regulators 12, 14 each include a respective "over current" terminal 28, 30 to indicate the existence of an over current condition within the regulator. The second and third voltage regulators 14, 16 each include a respective "under current" terminal 32, 34 to indicate the existence of an under current condition within the regulator. The first logic circuit 18 has a first input terminal that is coupled to the over current terminal 28 of the first voltage regulator 12 and a second input terminal that is coupled to the under current terminal 32 of the second voltage regulator 14. The first logic circuit 18 also has an output terminal that is coupled to an enable input of the second voltage regulator 14. The second logic circuit 20 has a first input terminal that is coupled to the over current terminal 30 of the second voltage regulator 14 and a second input terminal that is coupled to the under current terminal 34 of the third voltage regulator 16. The second logic circuit 20 also has an output terminal that is coupled to an enable input of the third voltage regulator 16.

Figure 2:
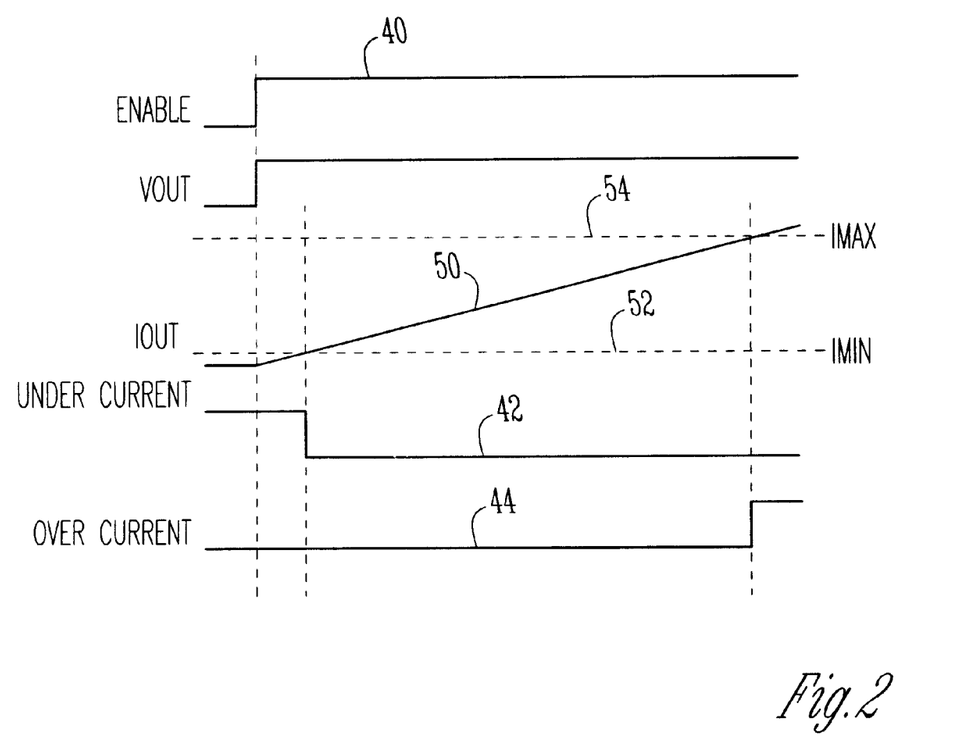
FIG. 2 is a timing diagram illustrating the operation of a voltage regulator unit in accordance with one embodiment of the present invention.

The first, second, and third voltage regulators 12, 14, 16 can each be implemented using well known regulator design techniques. The regulators 12, 14, 16 can include, for example, switching regulators, linear regulators, or any of a variety of other regulator types. FIG. 2 is a timing diagram illustrating the operation of a voltage regulator unit in accordance with one embodiment of the present invention. When an enable signal 40 is switched to a logic high value, the corresponding regulator is "enabled" and a substantially constant magnitude (i.e., regulated) output voltage Vout appears at the output of the regulator. This regulated voltage remains on the regulator output until the enable signal 40 later transitions to a logic low value (not shown). Once the voltage regulator is enabled, the output current drawn from the voltage regulator will depend upon the requirements of the device being driven. Each voltage regulator will typically have a minimum and maximum operating current level. Operation above the maximum current level may potentially damage a regulator. Operation below the minimum current level can be inefficient. The maximum and minimum current levels that are specified for a regulator will normally include some margin to ensure safe, efficient operation (e.g., the specified maximum current level will normally be well below a level that is believed to be unsafe). As shown in FIG. 2, the voltage regulator will generate an under current signal 42 to indicate when the output current 50 of the regulator is at or below the minimum current level Imin 52 of the regulator. Similarly, the voltage regulator will generate an over current signal 44 to indicate when the output current 50 is at or above the maximum current level Imax 54 of the regulator. In the illustrated embodiment, the under current signal 42 and the over current signal 44 each use a logic high value on a corresponding signal line to provide respective indications.

Referring back to FIG. 1, when the voltage regulator system 10 is active and coupled to the load device 26, the first voltage regulator 12 will be enabled. The second and third voltage regulators 14, 16, however, will only be enabled when certain current conditions exist within the system 10. The first logic circuit 18 generates the enable signal for the second voltage regulator 14 based upon the signals on the over current terminal 28 of the first voltage regulator 12 and the under current terminal 32 of the second voltage regulator 14. Similarly, the second logic circuit 20 generates the enable signal for the third voltage regulator 16 based upon the signals on the over current terminal 30 of the second voltage regulator 14 and the under current terminal 34 of the third voltage regulator 16. In one approach, the first logic circuit 18 enables the second voltage regulator 14 (e.g., by applying a logic high value to the enable terminal thereof) when the signal at the over current terminal 28 of the first voltage regulator 12 transitions from a logic low value to a logic high value. Thus, the second voltage regulator 14 is enabled when the first voltage regulator 12 enters an over current state from a normal current state. The first logic circuit 18 will subsequently disable the second voltage regulator 14 (e.g., by applying a logic low value to the enable terminal thereof) when the signal at the under current terminal 32 of the second voltage regulator 14 transitions from a logic low value to a logic high value. The second logic circuit 20 will preferably operate in substantially the same manner.

In a preferred approach, the first and second logic blocks 18, 20 are implemented using state machines. For example, a first state machine will drive the enable input of the second voltage regulator 14 to an active level when the over current terminal 28 of the first voltage regulator 12 transitions from an inactive level to an active level and will drive the enable input of the second voltage regulator 14 to an inactive level when the under current terminal 32 of the second voltage regulator 14 transitions from an inactive level to an active level. Similarly, a second state machine will drive the enable input of the third voltage regulator 16 to an active level when the over current terminal 30 of the second voltage regulator 14 transitions from an inactive level to an active level and will drive the enable input of the third voltage regulator 16 to an inactive level when the under current terminal 34 of the third voltage regulator 16 transitions from an inactive level to an active level. Methods for implementing state machines of this type are well known in the art.

In one aspect of the present invention, the first, second, and third voltage regulators 12, 14, 16 will each have a maximum output current that is different from the others. More specifically, the second voltage regulator 14 will have a maximum output current that is greater than that of the first voltage regulator 12 and the third voltage regulator 16 will have a maximum output current that is greater than that of the second voltage regulator 14. As discussed previously, each of the voltage regulators will draw a quiescent current (when enabled) that is related to the maximum output current of the regulator. Thus, the enabled quiescent current of the third voltage regulator 16 will be greater than that of the second voltage regulator 14 and the enabled quiescent current of the second voltage regulator 14 will be greater than that of the first voltage regulator 12 using this approach. Each of the voltage regulators will also draw a quiescent current when they are disabled, but this current will be significantly less than the corresponding enabled quiescent current. When the device 26 being powered by the voltage regulator system 10 is drawing relatively low current, only the first voltage regulator 12 will be enabled and the overall quiescent current draw of the system 10 will be low (i.e., the sum of the enabled quiescent current of the first voltage regulator 12 and the disabled quiescent currents of the second and third voltage regulators 14, 16). When the device 26 is drawing a somewhat higher current, both the first and second voltage regulators 12, 14 will be enabled and the overall quiescent current draw of the system 10 will be higher (i.e., the sum of the enabled quiescent currents of the first and second voltage regulators 12, 14 and the disabled quiescent current of the third voltage regulator 16). When the device 26 is drawing high current, all three of the voltage regulators 12, 14, 16 will be enabled and the overall quiescent current draw of the system 10 will be correspondingly high (i.e., the sum of the enabled quiescent currents of all of the voltage regulators 12, 14, 16). However, unlike past regulators, this high quiescent current will only exist during periods of high load current. When the load current eventually decreases, the overall quiescent current returns to the low value.

Figure 3:
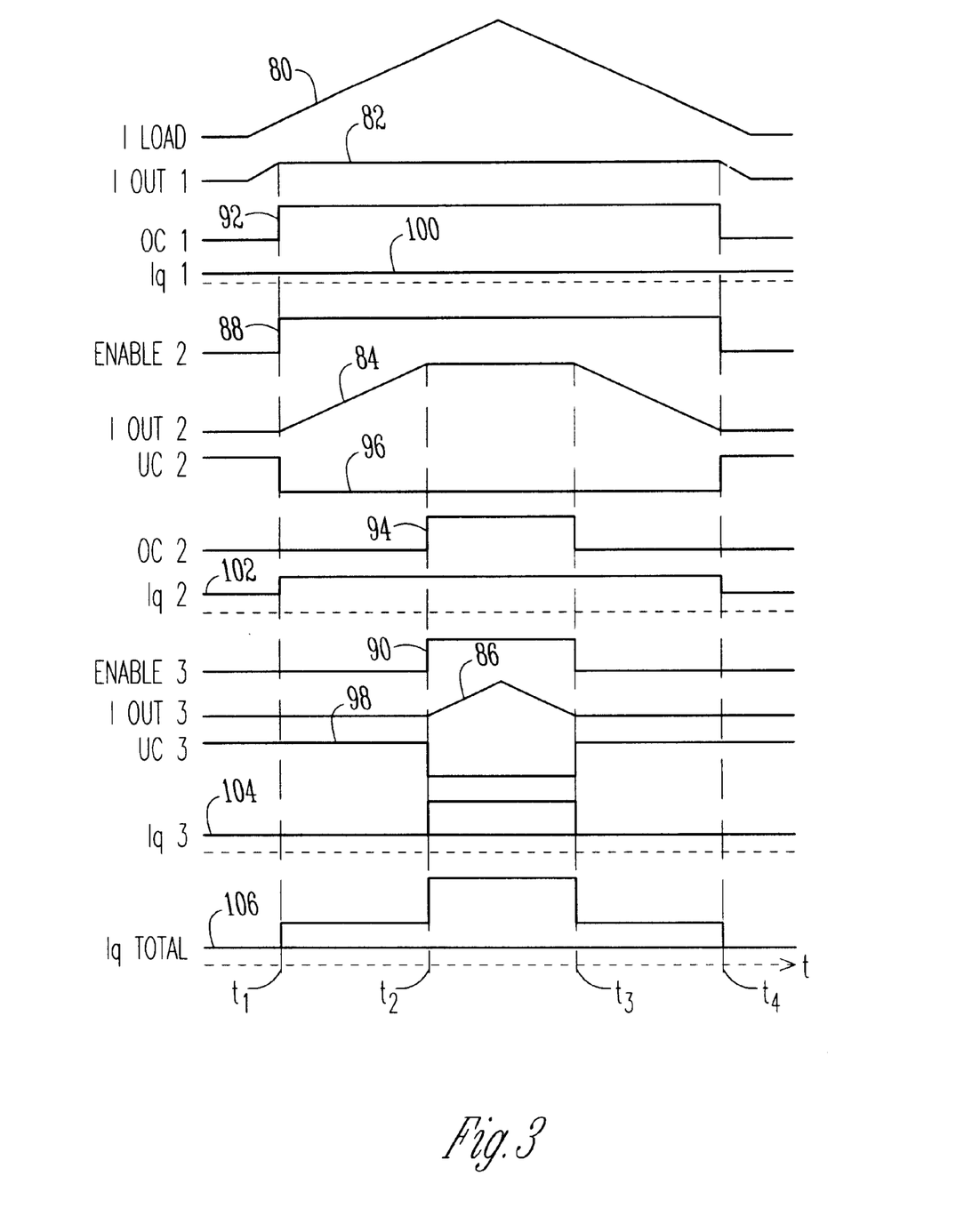
FIG. 3 is a timing diagram illustrating the operation of the voltage regulator system of FIG. 1 in one embodiment of the present invention.

FIG. 3 is a timing diagram illustrating the operation of the voltage regulator system 10 of FIG. 1 in accordance with one embodiment of the present invention. The "I load" waveform 80 in FIG. 3 represents the load current being drawn by the device 26 during a particular operational time period. For convenience, a triangular current profile has been used. The "Iout 1" waveform 82, the "Iout 2" waveform 84, and the "Iout 3" waveform 86 represent the output currents of the first, second, and third voltage regulators 12, 14, 16, respectively. The "enable 2" waveform 88 represents the enable signal for the second voltage regulator 14 and the "enable 3" waveform 90 represents the enable signal for the third voltage regulator 16. The "OC 1" waveform 92 and the "OC 2" waveform 94 represent the over current signals generated by the first and second voltage regulators 12, 14, respectively. The "UC 2" waveform 96 and the "UC 3" waveform 98 represent the under current signals generated by the second and third voltage regulators 14, 16, respectively. The "Iq 1" waveform 100, the "Iq 2" waveform 102, and the "Iq 3" waveform 104 represent the individual quiescent currents of the first, second, and third voltage regulators 12, 14, 16, respectively. The "Iq total" waveform 106 represents the overall quiescent current of the voltage regulator system 10.

With reference to FIG. 3, when the load current (I load 80) is relatively low, the first voltage regulator 12 supplies all of the load current to the driven device 26. Thus, the Iout 1 waveform 82 mimics the I load waveform 80 for small load current values. At time t1, the first voltage regulator 12 reaches its maximum output current and the Iout 1 waveform 82 flattens. The OC 1 waveform 92 correspondingly transitions to a logic high value. This transition causes the enable 2 waveform 88 to transition to a logic high value, thus enabling the second voltage regulator 14. Preferably, the current level indicated by the OC 1 waveform 92 will be greater than the current level indicated by the UC 2 waveform 96 to ensure a reliable transition between the first voltage regulator 12 and the second voltage regulator 14. Further increases in I load 80 are now supplied by the second voltage regulator 14, as illustrated by the Iout 2 waveform 84. At time t2, the second voltage regulator 14 reaches its maximum output current and the Iout 2 waveform 84 flattens. The OC 2 waveform 94 accordingly transitions to a logic high value. This transition causes the enable 3 waveform 90 to transition to a logic high value, thus enabling the third voltage regulator 16. As before, the current level indicated by the OC 2 waveform 94 is preferably greater than the current level indicated by the UC 3 waveform 98 to ensure a reliable transition between the second voltage regulator 14 and the third voltage regulator 16. Further increases in I load 80 are now supplied by the third voltage regulator 16, as illustrated by the Iout 3 waveform 86.

Eventually, the magnitude of the I load waveform 80 begins to decrease. Correspondingly, the Iout 3 waveform 86 begins to decrease. At time t3, the Iout 3 waveform 86 reaches the minimum current value of the third voltage regulator 16. The UC 3 waveform 98 accordingly transitions to a logic high value indicating the presence of an under current condition in the third voltage regulator 16. This under current indication causes the enable 3 waveform 90 to transition to a logic low value, thus disabling the third voltage regulator 16. The Iout 2 waveform 84 then begins to decrease. At time t4, the Iout 2 waveform 84 reaches the minimum current value of the second voltage regulator 14 and the UC 2 waveform 96 accordingly transitions to a logic high value indicating the presence of an under current condition in the second voltage regulator 14. This under current indication causes the enable 2 waveform 88 to transition to a logic low value, thus disabling the second voltage regulator 14. As shown by the Iq total waveform 106, the overall quiescent current of the voltage regulator system 10 roughly follows the load current (I load 80) of the system 10. Therefore, when the driven device 26 is drawing low currents, a relatively small quiescent current is being generated within the system 10. As described previously, this can result in a significant power savings, particularly in applications where low current operation is common. It should be noted that the OC 1 waveform 92 of FIG. 3 will only have an effect on the system 10 when the waveform 92 transitions from an inactive level to an active level (e.g., as at time t1). Similarly, the UC 2 waveform 96 of FIG. 3 will only have an effect on the system 10 when the waveform 96 transitions from an inactive level to an active level (e.g., as at time t4). This also applies to the OC 2 waveform 94 and the UC 3 waveform 98.

As discussed previously, in one possible application, the inventive principles are used to provide power to a device having a number of different operating modes that each draw a different current level. For example, the voltage regulator system 10 of FIG. 1 can be used to power a handheld communicator unit having a sleep mode that draws a maximum current of 500 microamps ($\mu$A), a communicate mode that draws a maximum current of 500 milliamps (mA), and an operate mode that draws a maximum current of 5 amps (A). Accordingly, the maximum current levels of the first, second, and third regulators 12, 14, 16 can be selected based upon the maximum currents associated with the different operational modes of the communicator. For example, in one approach, the maximum current levels of the regulators 12, 14, 16 are selected to be the same as or slightly higher than the maximum currents associated with the respective operational modes. Thus, the maximum current of the first voltage regulator 12 might be 500 $\mu$A, the maximum current of the second voltage regulator 14 might be 500 mA, and the maximum current of the third voltage regulator 16 might be 5 A. Based on these maximum current values, possible "enabled" quiescent currents for the three regulators 12, 14, 16 could be 15 $\mu$A, 2 mA, and 20 mA, respectively. Possible "disabled" quiescent currents could be 1 $\mu$A, 5 $\mu$A, and 20 $\mu$A, respectively. Therefore, during sleep mode, only the first voltage regulator 12 will be enabled and the total quiescent current of the system 10 will be the sum of 15 $\mu$A, 5 $\mu$A, and 20 $\mu$A, or 40 $\mu$A. During communicate mode, the first and second voltage regulators 12, 14 will be enabled and the total quiescent current of the system 10 will be the sum of 15 $\mu$A, 2 mA, and 20 $\mu$A, or 2.035 mA. During operate mode, all of the voltage regulators 12, 14, 16 will be enabled and the total quiescent current of the system 10 will be the sum of 15 $\mu$A, 2 mA, and 20 mA, or approximately 22 mA. In a similar implementation, the system 10 can be used to provide power to a universal serial bus (USB) having a sleep mode, an enumerate mode, and an operate mode. As will be apparent to a person of ordinary skill in the art, a wide variety of different devices and systems can be powered using the principles of the present invention.

Figure 4:
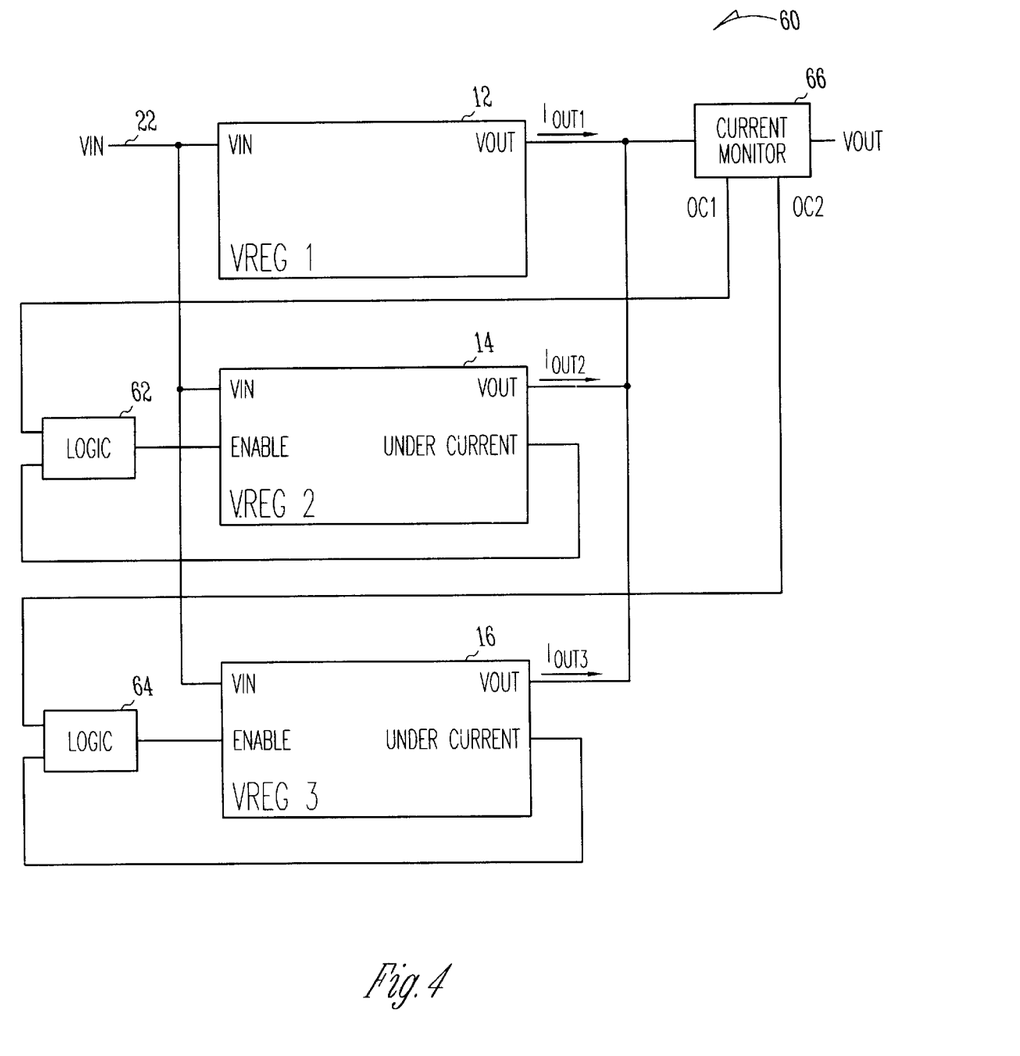
FIG. 4 is a block diagram illustrating a voltage regulator system in accordance with another embodiment of the present invention.

FIG. 4 is a block diagram illustrating a voltage regulator system 60 in accordance with another embodiment of the present invention. The voltage regulator system 60 is similar to the system 10 of FIG. 1, but does not require state machines in the logic blocks 62, 64. Instead, the system 60 uses a current monitor 66 that senses the total output current of the system 60 and uses the resultant information to generate control signals for delivery to inputs of the combinatorial logic blocks 62, 64. Output OC1 from current monitor 66 is set to transition to an active logic level when the current detected by the current monitor 66 is greater than a maximum threshold of the first voltage regulator 12. Similarly, output OC2 from current monitor 66 is set to transition to an active logic level when the current detected by current monitor 66 is greater than a maximum threshold of the second voltage regulator 14.

Figure 5:
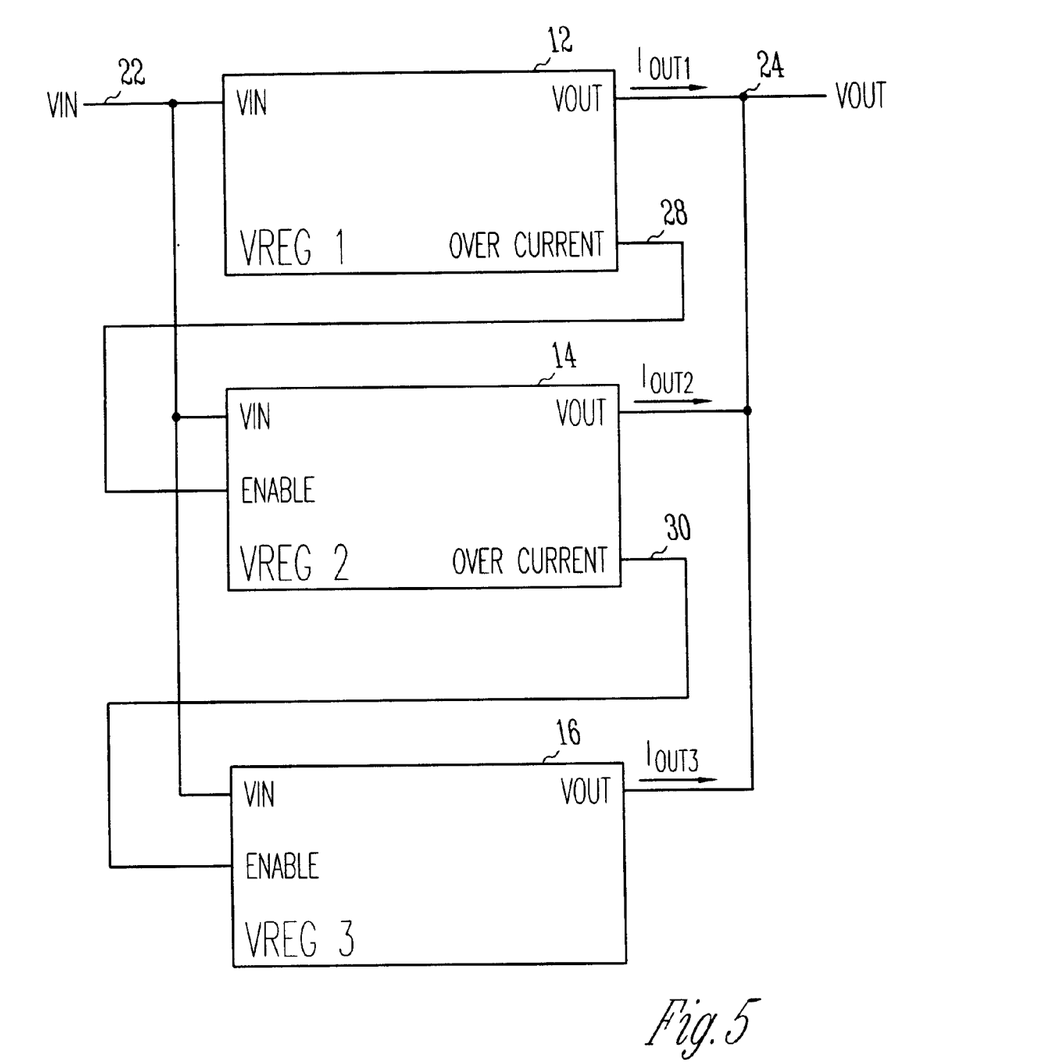
FIG. 5 is a block diagram illustrating a voltage regulator system in accordance with yet another embodiment of the present invention.

FIG. 5 is a block diagram illustrating a voltage regulator system 70 in accordance with yet another embodiment of the present invention. The voltage regulator system 70 is similar to the system 10 of FIG. 1 and the system 60 of FIG. 4, but does not use the under current signals of the second and third regulators 14, 16 to generate the enable signals for these units. Instead, the system 70 uses only the over current signal of a previous regulator to enable and disable the second and third regulators 14, 16. Thus, the second voltage regulator 14 will be enabled when the first voltage regulator 12 enters an over current state and disabled when the first voltage regulator 12 subsequently leaves the over current state. Similarly, the third voltage regulator 16 will be enabled when the second voltage regulator 14 enters an over current state and disabled when the second voltage regulator 14 subsequently leaves the over current state. As can be appreciated, the system 70 of FIG. 5 can be implemented using less logic than the system 10 of FIG. 1 or the system 60 of FIG. 4. In one approach, the output voltage of the first voltage regulator 12 of the system 70 is made slightly greater than the output voltage of the second voltage regulator 14 and the output voltage of the second voltage regulator 14 is made slightly greater than that of the third voltage regulator 16. This is done so that the first voltage regulator 12 will be supplying maximum current to the load when the second voltage regulator 14 is enabled and the second voltage regulator 14 will be supplying maximum current to the load when the third voltage regulator 16 is enabled.

The principles of the present invention can be implemented using two or more voltage regulators. The actual number of regulators used in a particular implementation and the maximum current values of the regulators will generally depend upon the load device(s) to be driven. In addition, although the voltage regulators 12, 14, 16 in system 10 of FIG. 1 have been described as having different maximum current values from one another, it should be understood that the inventive principles can also be implemented using multiple similar or identical voltage regulators. The various signals that have been discussed herein have typically been described as transitioning between a logic high and a logic low value. It should be understood that there are many ways to indicate a particular occurrence or event using electrical signals and the particular signal schemes discussed herein are not intended to be limiting.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A voltage regulator system comprising:
an output terminal to connect to a load impedance;
a first voltage regulator to generate a regulated output voltage on said output terminal; and
a second voltage regulator to generate a regulated output voltage on said output terminal, wherein said second voltage regulator is enabled based upon an output current of said first voltage regulator;
wherein said first voltage regulator generates an over current indication when the output current of said first voltage regulator exceeds a threshold value, said second voltage regulator being enabled in response to said over current indication generated by said first voltage regulator, said second voltage regulator being enabled via a logic circuit having a first input terminal to receive an over current indication of said first voltage regulator and an output terminal coupled to an enable input of the second voltage regulator; and
wherein said second voltage regulator is disabled based upon an output current of said second voltage regulator.

2. A voltage regulator system comprising:
an output terminal to connect to a load impedance;
a first voltage regulator to generate a regulated output voltage on said output terminal; and
a second voltage regulator to generate a regulated output voltage on said output terminal, wherein said second voltage regulator is enabled based upon an output current of said first voltage regulator;
wherein said first voltage regulator generates an over current indication when the output current of said first voltage regulator exceeds a threshold value, said second voltage regulator being enabled in response to said over current indication generated by said first voltage regulator, said second voltage regulator being enabled via a logic circuit having a first input terminal to receive an over current indication of said first voltage regulator and an output terminal coupled to an enable input of the second voltage regulator, and
wherein said second voltage regulator generates an under current indication when an output current of said second voltage regulator falls below a second threshold value, said second voltage regulator being disabled in response to said under current indication generated by said second voltage regulator.

3. A voltage regulator system comprising:
an output terminal to connect to a load impedance;
a first voltage regulator to generate a regulated output voltage on said output terminal; and
a second voltage regulator to generate a regulated output voltage on said output terminal, wherein said second voltage regulator is enabled based upon an output current of said first voltage regulator;
wherein said first voltage regulator generates an over current indication when the output current of said first voltage regulator exceeds a threshold value, said second voltage regulator being enabled in response to said over current indication generated by said first voltage regulator, said second voltage regulator being enabled via a logic circuit having a first input terminal to receive an over current indication of said first voltage regulator and an output terminal coupled to an enable input of the second voltage regulator; and wherein said first voltage regulator has a first maximum current value and said second voltage regulator has a second maximum current value, said second maximum current value being significantly greater than said first maximum current value.

4. A voltage regulator system comprising:

an output terminal to connect to a load impedance;

a first voltage regulator coupled to said output terminal to provide a regulated voltage thereon;

a second voltage regulator coupled to said output terminal to provide a regulated voltage thereon;

means for enabling said second voltage regulator based on an output current of said first voltage regulator, wherein said means for enabling enables said second voltage regulator when said first voltage regulator transitions from a normal current condition to an over current condition, said means comprising electrical sensing means operable to receive an over current indication of said first voltage regulator via a first input, and electrical control means coupled to enable the second voltage regulator via an input connection of the second voltage regulator; and means for disabling said second voltage regulator based on an output current of said second voltage regulator.

5. A voltage regulator system comprising:

an output terminal to connect to a load impedance;

a first voltage regulator coupled to said output terminal to provide a regulated voltage thereon;

a second voltage regulator coupled to said output terminal to provide a regulated voltage thereon;

means for enabling said second voltage regulator based on an output current of said first voltage regulator, wherein said means for enabling enables said second voltage regulator when said first voltage regulator transitions from a normal current condition to an over current condition, said means comprising electrical sensing means operable to receive an over current indication of said first voltage regulator via a first input, and electrical control means coupled to enable the second voltage regulator via an input connection of the second voltage regulator;

a third voltage regulator coupled to said output terminal to provide a regulated voltage thereon; and means for enabling said third voltage regulator based on an output current of said second voltage regulator.

6. A voltage regulator system comprising:

an output terminal to connect to a load impedance;

a first voltage regulator to generate a regulated output voltage on said output terminal; and a second voltage regulator to generate a regulated output voltage on said output terminal, wherein said second voltage regulator is enabled based upon an output current of said first voltage regulator;

wherein said second voltage regulator generates an over current indication when an output current of said second voltage regulator exceeds a third threshold value, said voltage regulator system further comprising a third voltage regulator to generate a regulated output voltage at said output terminal, said third voltage regulator being enabled in response to the over current indication generated by said second voltage regulator, wherein said first, second, and third voltage regulators each contribute to an output current of said voltage regulator system when said third voltage regulator is enabled.

7. The voltage regulator system claimed in claim 6, wherein:

said first voltage regulator has a first maximum current value, said second voltage regulator has a second maximum current value, and said third voltage regulator has a third maximum current value, wherein said second maximum current value is significantly greater than said first maximum current value and said third maximum current value is significantly greater than said second maximum current value.

8. The voltage regulator system claimed in claim 6, wherein:

said third voltage regulator generates an under current indication when an output current of said third voltage regulator falls below a fourth threshold value, said third voltage regulator being disabled in response to said under current indication generated by said third voltage regulator.

9. A voltage regulator system comprising:

an output terminal to connect to a load impedance;

a first voltage regulator to generate a regulated output voltage on said output terminal;

a second voltage regulator to generate a regulated output voltage on said output terminal, wherein said second voltage regulator is enabled based upon an output current of said first voltage regulator; and a current monitor coupled to said output terminal of said voltage regulator system to detect an output current of said system, said current monitor generating a control signal based on said detected output current, and a logic circuit having a first input terminal to receive said control signal, a second input terminal to receive an under current indication of said second voltage regulator, and an output terminal coupled to an enable input of the second voltage regulator.

10. The voltage regulator system claimed in claim 9, wherein:

said logic circuit is a combinatorial logic circuit.

11. The voltage regulator system claimed in claim 9, wherein:

said control signal generated by said current monitor transitions to an active level when the current detected by said current monitor is greater than a threshold value associated with said first voltage regulator.

12. An electrical apparatus comprising:

a first terminal to connect said electrical apparatus to a power source;

an electrical device having a second terminal to receive a regulated voltage; and a voltage regulator system connected between said first terminal and said second terminal, said voltage regulator system comprising:

a first voltage regulator to generate a regulated output voltage on said second terminal; and a second voltage regulator to generate a regulated output voltage on said second terminal, wherein said second voltage regulator is enabled based upon an output current of said first voltage regulator;

wherein said first voltage regulator generates an over current indication when the output current of said first voltage regulator exceeds a threshold value, said second voltage regulator being enabled in response to said over current indication generated by said first voltage regulator, said second voltage regulator being enabled via a logic circuit having a first input terminal to receive the over current indication of said first voltage regulator and an output terminal coupled to an enable input of the second voltage regulator;

wherein said electrical device has multiple modes of operation that each have a different maximum current requirement.

13. The electrical apparatus claimed in claim 12, wherein:

said first and second voltage regulators each have a maximum output current value that is related to the maximum current requirement of at least one of the multiple modes of operation of the electrical device.

14. A voltage regulator system comprising:

an output terminal to connect to a load impedance;

a first voltage regulator coupled to said output terminal to provide a regulated voltage thereon;

a second voltage regulator coupled to said output terminal to provide a regulated voltage thereon;

means for enabling said second voltage regulator based on an output current of said first voltage regulator; and means for disabling said second voltage regulator based on an output current of said second voltage regulator;

wherein said means for disabling disables said second voltage regulator when said second voltage regulator transitions from a normal current condition to an under current condition, said means comprising electrical sensing means operable to receive an over current indication of said first voltage regulator via a first input, and electrical control means coupled to enable the second voltage regulator via an input connection of the second voltage regulator.

15. The voltage regulator system of claim 14, wherein:

said means for enabling includes a current monitor coupled to said output terminal of said voltage regulator system to detect an output current of said system.

16. The voltage regulator system of claim 14, wherein:

said means for enabling includes a logic circuit.

17. A voltage regulator system comprising:

an output terminal to connect to a load impedance;

a first voltage regulator to generate a regulated output voltage on said output terminal; and a second voltage regulator to generate a regulated output voltage on said output terminal, wherein said second voltage regulator is enabled based upon an output current of said first voltage regulator; and a logic circuit having a first input terminal to receive an over current indication of said first voltage regulator, a second input terminal to receive an under current indication of said second voltage regulator, and an output terminal coupled to an enable input of the second voltage regulator.

18. The voltage regulator system claimed in claim 17, wherein:

said logic circuit includes a state machine.

19. The voltage regulator system claimed in claim 17, wherein:

said logic circuit enables said second voltage regulator in response to the initiation of an over current condition within said first voltage regulator.

20. The voltage regulator system claimed in claim 17, wherein:

said logic circuit disables said second voltage regulator in response to the initiation of an under current condition within said second voltage regulator.

* * * * *